United States Patent
Marupaduga (10) Patent No.: US 11,146,987 B1
(45) Date of Patent: Oct. 12, 2021

(54) DYNAMICALLY ADJUSTING EXTENT OF MU-MIMO SERVICE BASED ON BUFFER OCCUPANCY

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 16/830,941

(22) Filed: Mar. 26, 2020

(51) Int. Cl.
*H04W 28/02* (2009.01)
*H04B 7/024* (2017.01)
*H04B 7/0452* (2017.01)
*H04W 48/06* (2009.01)
*H04L 12/801* (2013.01)
*H04W 28/12* (2009.01)
*H04L 12/835* (2013.01)

(52) U.S. Cl.
CPC ........ *H04W 28/0278* (2013.01); *H04B 7/024* (2013.01); *H04B 7/0452* (2013.01); *H04L 47/29* (2013.01); *H04L 47/30* (2013.01); *H04W 28/12* (2013.01); *H04W 48/06* (2013.01)

(58) Field of Classification Search
None
See application file for complete search history.

(56) References Cited

U.S. PATENT DOCUMENTS

| | | | |
|---|---|---|---|
| 10,085,197 B1* | 9/2018 | Mansour | H04W 28/0268 |
| 10,313,920 B1* | 6/2019 | Manchanda | H04L 43/16 |
| 10,320,519 B1* | 6/2019 | Kothari | H04W 28/0278 |
| 10,412,691 B1* | 9/2019 | Marupaduga | H04W 52/365 |
| 10,470,073 B1* | 11/2019 | Marupaduga | H04W 28/08 |
| 10,602,478 B1* | 3/2020 | Marupaduga | H04B 7/0452 |
| 10,716,124 B1* | 7/2020 | Marupaduga | H04W 64/003 |
| 10,790,885 B1* | 9/2020 | Raghunathan | H04W 28/0205 |
| 10,819,402 B1* | 10/2020 | Marupaduga | H04W 72/121 |
| 10,862,553 B1* | 12/2020 | Kim | H04L 27/2601 |
| 10,958,317 B1* | 3/2021 | Marupaduga | H04L 5/0053 |
| 2013/0157613 A1* | 6/2013 | Limber | H04L 43/0882 455/405 |
| 2019/0215840 A1* | 7/2019 | Park | H04L 5/0064 |

* cited by examiner

*Primary Examiner* — Anh Vu H Ly (57) ABSTRACT

Methods and systems for controlling application of MU-MIMO service by a base station are provided. The disclosure provides for determining a base station's buffer occupancy and then, based on the determined buffer occupancy, setting a maximum limit on a quantity of UEs that the base station will concurrently provide with MU-MIMO service. For instance, a system could determine that the base station's buffer occupancy is at least predefined threshold high and, based at least on that determination, could increase the maximum limit. Or, the system could determine that the base station's buffer occupancy is at least predefined threshold low and, based at least on that determination, could decrease the maximum limit.

17 Claims, 5 Drawing Sheets

DYNAMICALLY ADJUSTING EXTENT OF MU-MIMO SERVICE BASED ON BUFFER OCCUPANCY

BACKGROUND

A wireless communication system typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each coverage area in such a system could operate in accordance with a particular radio access technology, with air-interface communications from the base stations to UEs defining a downlink or forward link and air-interface communications from the UEs to the base stations defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define air-interface resources for carrying information between the base stations and UEs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

The base station could then be configured to coordinate use of these air-interface resources on an as-needed basis. For example, when the base station has data to transmit to a UE, the base station could allocate particular downlink air-interface resources to carry that data and could accordingly transmit the data to the UE on the allocated downlink resources. And when a UE has data to transmit to the base station, the UE could transmit to the base station an uplink resource request, the base station could responsively allocate particular uplink air-interface resources to carry the data, and the UE could then transmit the data to the base station on the allocated uplink resources.

OVERVIEW

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, a base station can engage in air interface communication concurrently on multiple different radio-frequency (RF) propagation paths, or MIMO "layers," with multiple layers occupying the same frequency resources (e.g., subcarriers and PRBs) as each other. To facilitate this, the base station could be equipped with a MIMO antenna array, comprising multiple transmit antennas and multiple receive antennas. By suitably weighting and precoding transmissions by particular antennas in the array, the base station can then output spatially separate but concurrent transmissions for receipt by multiple UEs. Because these concurrent transmissions occupy the same frequency resources (e.g., subcarriers) as each other, MIMO can thereby support a greater extent of data communication per unit frequency, thereby increasing the base stations' spectral efficiency and possibly avoiding or deferring the need to add more spectrum.

MIMO service could be used in a "single-user MIMO" (SU-MIMO) configuration to increase the data rate of transmission to a single UE, by multiplexing communications to the UE onto multiple separate layers using the same air-interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the base station's transmit signals.

MIMO service could also be used in a "multi-user MIMO" (MU-MIMO) configuration to increase the data capacity of the air interface by allowing communications to multiple UEs to use the same air-interface resources as each other. For instance, a base station can modulate data streams destined to each of multiple UEs on the same PRBs as each other and can transmit the modulated data streams on separate respective propagation paths for receipt by the UEs. To facilitate this, the base station could pre-code transmissions on each propagation path using weighted coefficients based on channel estimates from the UEs, in a manner that enables each UE to remove cross-talk and receive its intended data. Further, the base station could beamform the transmissions respectively to each UE to help physically distinguish the transmissions from each other.

In dense urban markets and other areas, a base station may serve a great many UEs at once or may otherwise need to support high aggregate throughput, but may have limited available spectrum, such as a limited number of PRBs per timeslot. In such situations, the base station could beneficially increase the extent of its MU-MIMO service in order to provide concurrent high-throughput transmissions to the UEs. For example, if the base station's air interface has 100 PRBs that are used to serve 8 UEs and the base station is equip with a MIMO antenna array that supports up to 16 MIMO "layers", the base station could transmit concurrently to 3 of those 8 UEs with 2 layers apiece on all 100 of those PRBs. Each of the 3 UEs would theoretically receive two times the single-layer data capacity of those 100 PRBs, but the remaining 5 UEs would only receive the single-layer data capacity of those 100 PRBs. By comparison, if the base station increased its MU-MIMO service and transmitted concurrently to all 8 UEs with 2 layers apiece on all 100 of those PRBs, each of the 8 UEs could theoretically receive two times the single-layer data capacity of those 100 PRBs, thus providing higher throughput. (Further, if instead of applying MU-MIMO, the base station were to apply just SU-MIMO with 2 layers apiece for each of those 8 UEs, then the base station might transmit to each UE with 2 layers on just about 12 PRBs, thus providing lower throughput than both of the aforementioned MU-MIMO implementations.)

However, a problem with a base station's implementation of MU-MIMO is that it could consume extensive processing and memory resources at the base station. In particular, when a base station provides additional UEs with MU-MIMO service, the base station may need to perform additional computations to pre-code and beamform the transmissions to those additional UEs so as to physically distinguish those transmissions from transmissions to other UEs. The greater the quantity of UEs the base station provides with MU-MIMO service, the greater the number of computations the base station may be required to perform. Thus in some situations it could be useful for a base station to reduce the extent of its application of MU-MIMO service so as to decrease the base station's overall computational costs.

Given these competing concerns between increasing high-throughput transmissions to UEs and decreasing computational costs, it may be beneficial to dynamically limit the extent of MU-MIMO service that a base station would be configured to provide at any given time. For example, the base station could limit the extent of its MU-MIMO service by setting a maximum limit on the quantity of UEs that the base station will concurrently provide with MU-MIMO service, so that at any given time the base station would provide MU-MIMO service to no more than that limited quantity of UEs. For instance, the base station could set such a limit to ten UEs or five UEs, or for that matter zero UEs to avoid providing MU-MIMO service at all.

Further, it could be beneficial for the base station to set the value of the maximum limit based on a consideration of the base station's buffer occupancy, that is, a measure of quantity of data held in the base station's transmit buffer and waiting to be transmitted by the base station. For instance, if the base station has a high level of buffer occupancy—and thus a higher likelihood of delays in scheduling communication of buffered data—it could be useful for the base station to increase the maximum limit (e.g., provide up to a greater number of UEs with MU-MIMO service at any given time), thereby increasing the base station's potential data communications per unit frequency and thus possibly preventing scheduling delays by the base station. Alternatively, if the base station has a low level of buffer occupancy—and thus a lower likelihood of delays in scheduling communication of buffered data—it could be useful for the base station to decrease the maximum limit (e.g., provide up to a lesser number of UEs with MU-MIMO service at any given time) because a lesser extent of MU-MIMO service may be sufficient enough to address the base station's needs. This in turn reduces the computational costs at the base station.

Given this, the present disclosure provides for a system that could determine the buffer occupancy of a base station and then, based on the determined buffer occupancy, set the maximum limit on a quantity of UEs that the base station will concurrently provide with MU-MIMO service.

The described system could determine the buffer occupancy of the base station in various ways. For example, the system could evaluate the buffer occupancy of the base station as a measure of quantity of user-plane data that the base station has buffered awaiting downlink transmission to the UEs currently served by the base station. Further, the system could consider statistical measures of the buffer occupancy of the base station, such as averages per unit time over a recent sliding window, or the like, and the system could further consider historical trends regarding the buffer occupancy of the base station, such as on a time-of-day basis for instance.

In an example implementation of the described process, the maximum limit could be initially set to a default value, and the system could be configured to change the maximum limit from that default value to another value. For example, if the system determines that the buffer occupancy of the base station is at least predefined threshold high, then the system could increase the maximum limit from the default value, thereby increasing the potential number of UEs that the base station could concurrently provide with MU-MIMO service. Alternatively, if the system determines that the buffer occupancy of the base station is at least predefined threshold low, then the system could decrease the maximum limit from the default value, thereby decreasing the potential number of UEs that the base station could concurrently provide with MU-MIMO service. Further, the system could be configured to carry out this process continuously, when the base station faces threshold high processing or memory load, or in other scenarios.

In some implementations, after the system sets the maximum limit, the system could control the base station's application of MU-MIMO service to be in accordance with the set maximum limit. For example, if the base station is concurrently providing MU-MIMO service to a greater quantity of UEs than the set maximum limit, then the system could responsively decrease the quantity of UEs that the base station is concurrently providing with MU-MIMO service to be at or below the set maximum limit. Or, if the base station is concurrently providing MU-MIMO service to a fewer quantity of UEs than the set maximum limit, then the system could responsively increase the quantity of UEs that the base station is concurrently providing with MU-MIMO service to be at the set maximum limit.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

Figure 1:
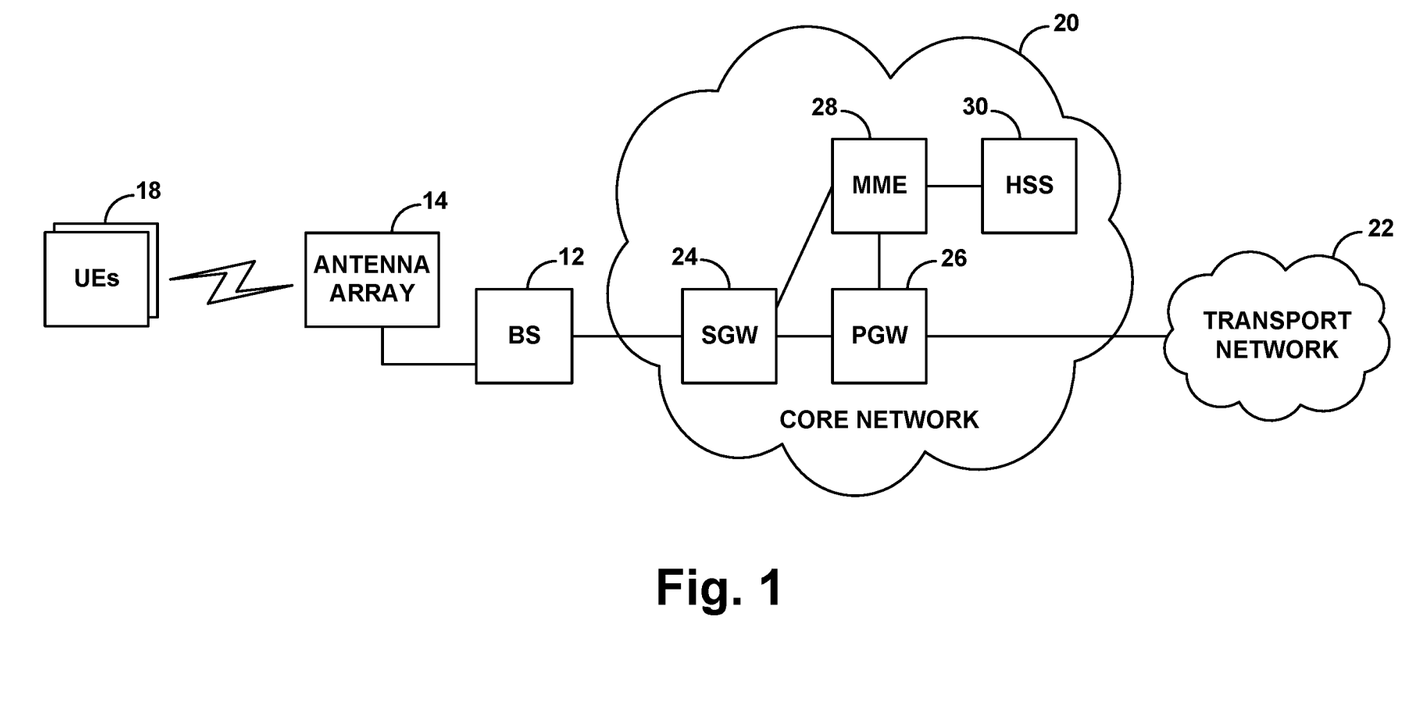
FIG. 1 is a simplified block diagram of a network arrangement in which aspects of the present disclosure can be implemented.

As shown in FIG. 1, the example wireless communication system includes a representative base station 12 having an antenna array 14 through which the base station is configured to provide coverage 16 on one or more carriers in one or more frequency bands. Shown operating within coverage of the base station are then a plurality of UEs 18, which could be devices of the type discussed above, among other possibilities.

The base station could be a macro base station of the type configured to provide a wide range of coverage, and the antenna array could be mounted on a tower or other tall structure. Alternatively, the base station could take other forms, such as a small cell base station, a repeater, a femtocell base station, or the like, which might be configured to provide a smaller range of coverage. The base station could be configured to operate according to a 4G, 5G, or other radio access technology. For instance, the base station could be an LTE evolved Node-B (eNB) or a 5GNR gigabit Node-B (gNB), among other possibilities.

The base station is shown coupled with a core network 20, which could be an enhanced packet core (EPC) network, next generation core (NGC) network, or another network including components supporting an applicable radio access technology and providing connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. In particular, the base station has an interface with the SGW, the SGW has an interface with the PGW, and the PGW provides connectivity with the transport network. Further, the base station has an interface with the MME, and the MME has an interface with the SGW and the HSS.

With this arrangement, the SGW and PGW cooperatively provide user-plane connectivity between the base station and the transport network, to enable a UE served by the base station to engage in communication on the transport network. And the MME operates as a controller to carry out operations such as coordinating UE attachment and setup of user-plane bearers. Further, the HSS includes or has access to a data store containing UE capabilities and service profile data and can work with the MME to facilitate UE authentication.

As discussed above, the air interface between the base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

In operation, when a UE enters into coverage of the base station on a carrier, the UE could detect the base station's synchronization signal and could then read the base station's MIB or the like to determine the carrier's bandwidth. The UE could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request, which the base station could forward to the MME for processing. And after working with the HSS to authenticate the UE, the MME could coordinate setup for the UE of one or more user-plane bearers between the base station and the PGW, to enable the UE to engage in communication on the transport network. Further, the base station could establish for the UE a context record indicating operational state of the UE, and the base station could receive from the UE and/or the HSS (via the MME) a set of capabilities and profile data for the UE and could store that data in the context record for reference while serving the UE.

The base station could then serve the UE with data communications.

For instance, when data arrives at the base station for transmission to the UE, the base station could buffer the data, pending transmission of the data to the UE. With the example air interface configuration noted above, the base station could then allocate downlink PRBs in an upcoming subframe for carrying at least some of the data, defining a transport block, to the UE. And in that subframe, the base station could transmit to the UE a scheduling directive that indicates which PRBs will carry the data, and the base station could transmit the data to the UE in those PRBs. Depending on PRB availability, the base station may schedule transmission of just some of the buffered data at a time. For instance, when the base station has a set of data buffered for transmission to the UE, the base station may schedule and engage in transmission of just some of that buffered data in one subframe and then schedule and engage in transmission of more of the buffered data in a subsequent subframe, and so forth.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the base station a positive acknowledgement (ACK) control message, and the base station could then proceed with transmission of a next transport block (if any) to the UE. Whereas, if the UE did not receive the transmission or determined that the CRC did not match and thus that there was an error in the received transport block, then the UE could transmit to the base station a negative acknowledgement (NACK), in response to which the base station could attempt the transmission again.

In practice, the base station may serve multiple connected UEs at a time, and the base station may face a need to schedule data transmissions concurrently to multiple such UEs. For example, as data arrives at the base station for transmission to the base station's various served UEs, the base station could buffer the data, so that at any given time the base station would have an aggregate extent of data buffered, awaiting downlink transmission to the base station's served UEs. Because the base station's air interface has just a finite, limited number of PRBs per unit time (e.g., per subframe), the base station could then implement a scheduling algorithm in an effort to fairly and appropriately allocate the downlink PRBs among the base station's served UEs.

Yet as noted above, the base station may still face load issues. For instance, there could be times when the base station is serving many connected UEs at once and faces a need to schedule data transmissions to many such UEs at once, but the base station does not have sufficient PRBs per unit time to adequately meet the throughput needs of the UEs.

As noted above, the base station could use MU-MIMO to help overcome this problem. In particular, the base station could apply MU-MIMO to facilitate serving multiple UEs at once on the same PRBs as each other and may thereby be able to provide the multiple UEs with a desired level of throughput while also achieving improved spectral efficiency. As further noted above, one way to provide such MIMO service is with use of a MIMO antenna array. Thus, in an example implementation, the base station's antenna array 14 could be a MIMO array.

Figure 2:
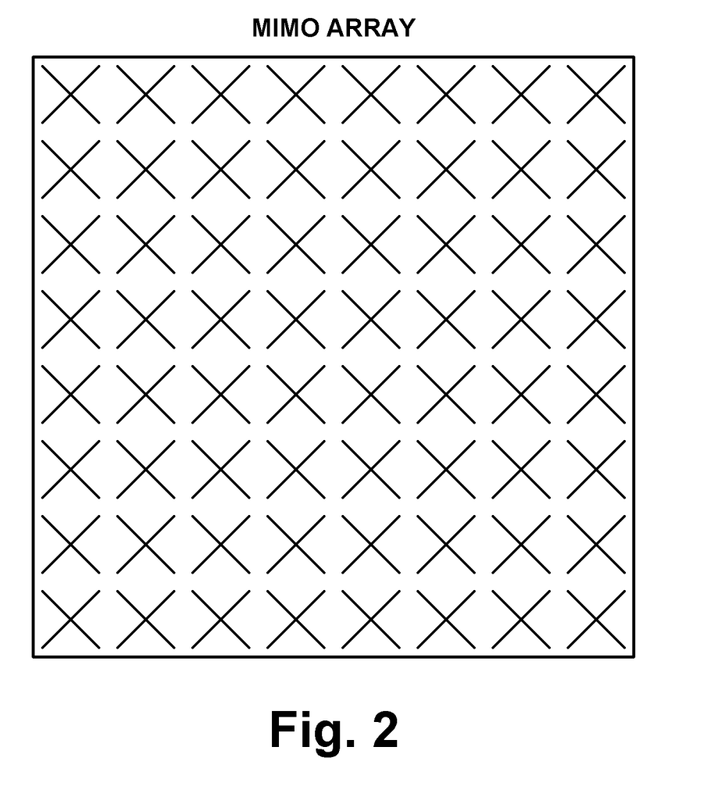
FIG. 2 is a simplified diagram of an example MIMO antenna array that could be implemented according to the disclosure.

FIG. 2 is a simplified diagram of an example MIMO array that could be implemented at base station 12. In this illustration, each X represents two antennas (or antenna elements), one with positive polarization and one with negative polarization. As a result, each column in the example array includes eight antennas with positive polarization and eight antennas with negative polarization. As there are eight columns of antennas, the MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

With this MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs). Other MIMO arrangements are possible as well.

As noted, the base station could transmit these individual MIMO layers to UEs, by beamforming and/or pre-coding the transmissions. For example, the base station could beamform transmissions to an individual UE by evaluating angle of arrival of uplink signals (e.g., an uplink sounding-reference-signal) from the UE or determining geolocation of the UE, and setting phase and amplitude of downlink transmission from various antenna elements so as to direct the transmission toward the UE. Further, the base station could pre-code individual transmissions to a UE to help the UE distinguish those transmissions from others and extract the transmissions from a combination of received downlink signals. For instance, the base station could transmit one or more downlink modulation reference signals (DMRSs) that the UE can receive and evaluate in order to establish and report channel estimates, and the base station could use those channel estimates as a basis to pre-code transmissions with weighted coefficients that enable the UE to receive and uncover the transmissions.

To facilitate MU-MIMO service, UEs that will share air-interface resources (e.g., PRBs) should be "orthogonal" to each other, meaning that each UE could receive spatially separate transmissions from the base station without undue interference from the base station's transmissions to each other UE. Thus, when the base station is going to apply MU-MIMO, the base station could select a group of UEs to be a MU-MIMO group based on the UEs being sufficiently orthogonal to each other. The base station could deem the UEs to be sufficiently orthogonal to each other if each UE has reported threshold high signal-to-noise-plus-interference ratio (SINR), and/or if the UEs are located at positions that are physically separate enough from each other so that the base station's RF transmission paths to the UEs would have sufficient angular separation, among other possibilities.

Assuming sufficient orthogonality between UEs in a MU-MIMO group, the base station could transmit to the UEs of the MU-MIMO group on the same PRBs as each other, i.e., at the same time and on the same subcarriers as each other. The transmissions to the UEs would occupy the same PRBs as each other, but would be distinguished from each other through beamforming, pre-coding, and/or one or more other mechanisms.

For example, in each downlink subframe, the base station could allocate a given set of PRBs to each of the UEs of the MU-MIMO group and could provide downlink transmission on the allocated PRB(s) respectively to each of the UEs of the MU-MIMO group, using one or more MIMO layers respectively for each UE. As noted above, this process could thereby increase the spectral efficiency of the base station by allowing the base station to serve more UEs at a time without requiring additional air-interface resources.

In practice, the base station could allocate all of the PRBs of a subframe to the MU-MIMO group, so that each UE of the MU-MIMO group can receive data transmissions on one or more MIMO layers within all of those PRBs. Alternatively, the base station might allocate some of the PRBs of the subframe to a first MU-MIMO group of UEs and transmit to those UEs with MIMO layers on those PRBs, and the base station might allocate other PRBs of the subframe to a second MU-MIMO group of UEs and transmit to those UEs with MIMO layers on those PRBs. Further, the base station might allocate some PRBs of the subframe for use without MIMO or in other ways.

To further improve its spectral efficiency, a base station could in theory increase the quantity of UEs that it concurrently provides with MU-MIMO service. For example, if the base station concurrently provides 4 UEs with MU-MIMO service, but has the capability (e.g., based the number of MIMO layers supported by the base station's MIMO antenna array) to provide up to 8 UEs with MU-MIMO service, the base station could configure itself to provide 4 additional UEs with MU-MIMO service, possibly configuring the additional 4 UEs as a new MI-MIMO group or adding the additional 4 UEs (assuming sufficiently orthogonality) to one or more existing MU-MIMO groups served by the base station. However, as noted above, providing additional UEs with MU-MIMO service could increase the computational overhead at the base station. In particular, providing a greater number of UEs with MU-MIMO service could cause the base station to perform additional beamforming, pre-coding, and/or other computationally intensive operations.

As noted above, given these competing concerns between increasing spectral efficiency and decreasing computational costs, it may be beneficial for a system to dynamically limit the extent of MU-MIMO service that a base station provides at any given time, for example, by setting a maximum limit on the quantity of UEs that the base station will concurrently provide with MU-MIMO service, so that at any given time the base station would provide MU-MIMO service to no more than that limited quantity of UEs.

Further, as also noted above, it could be beneficial for the system to set the value of the maximum limit based on a consideration of the base station's buffer occupancy. For instance, if the base station has a high level of buffer occupancy, it could be useful for the system to increase the maximum limit, thereby increasing the base station's potential data communications per unit frequency and thus preventing possible scheduling delays by the base station. Alternatively, if the base station has a low level of buffer occupancy, it could be useful for the system to decrease the maximum limit because a lesser extent of MU-MIMO service at the base station may be sufficient enough to address the base station's needs. This in turn reduces the computational costs at the base station.

Given this, the present disclosure provides for a system that could determine the buffer occupancy of a base station and then, based on the determined buffer occupancy, set the maximum limit on a quantity of UEs that the base station will concurrently provide with MU-MIMO service.

The system that carries out this process could be implemented by various entities. By way of example, the system could be implemented by the base station. For instance, the base station could periodically measure its own buffer occupancy, for example, taking measurements every minute, every hour, or possibly another time interval. During a given period, the base station could determine whether its buffer occupancy is greater than and/or less than one or more threshold levels of buffer occupancy. Based on its determination, the base station could set the maximum limit on the quantity of UEs that it will concurrently provide with MU-MIMO service. The base station could then control its application of MU-MIMO service in accordance with the set maximum limit.

As another example, the system could be implemented by an element management system (EMS) disposed within the core network and communicatively connected to the base station. In such an example, the base station could periodically report its buffer occupancy to the EMS, perhaps transmitting reports every minute or every hour, among other possibilities. Upon receiving a report from the base station, the EMS could determine whether the buffer occupancy of the base station is greater than and/or less than one or more threshold levels of buffer occupancy. Based on its determination, the EMS could calculate a maximum limit on the quantity of UEs that the base station will concurrently provide with MU-MIMO service. The EMS could then transmit to the base station a signaling message that specifies the maximum limit. And in response to the signaling message, the base station could control its application of MU-MIMO service in accordance with the maximum limit.

For simplicity, example implementations will now be described using a system implemented by the base station. However, it should be understood that the disclosed principles could apply in other scenarios with other entities as well.

In example implementations, the base station could evaluate its buffer occupancy as a measure of quantity of user-plane data that the base station has buffered awaiting downlink transmission to the UEs currently served by the base station. This could be a count of bytes of such data buffered for all such UEs connected with the base station and/or a percentage of a maximum buffer capacity occupied with such buffered data, among other possibilities. In some implementations, the base station could include different buffers for each of the various different carriers on which it provides service, and the downlink buffer occupancy of the base station could be a measure of quantity of user-plane data buffered for transmission by the base station to UEs connected with the base station with respect to a given carrier (or particular group of carriers). Further, the downlink buffer occupancy of a base station could be a statistical measure of such buffer occupancy, such as an average over a sliding window of time. And the downlink buffer occupancy could be current data (e.g., over a most recent or most-recently reported sliding window of time) or could be historical data, such as a rolled up average of such occupancy per time of day or the like.

The base station could measure its buffer occupancy and determine that its buffer occupancy is at least predefined threshold high. This could involve determining if the base station's actual/current buffer occupancy is threshold high. Alternatively or additionally, this could involve predicting, based on historical data, whether the base station's buffer occupancy is now threshold high or is about to be threshold high—such as by determining that the base station tends to have threshold high buffer occupancy at the current time of day. The base station could perform such measurements and determinations periodically, for instance, every minute, every hour, or possibly another time interval. As noted above, if during a given period the base station determines that the buffer occupancy is at least predefined threshold high, the base station could increase the maximum limit, thereby increasing the potential amount of UEs that the base station could concurrently provide with MU-MIMO service.

Likewise, the base station could measure its buffer occupancy and determine that its buffer occupancy is at least predefined threshold low. This could involve determining if the base station's actual/current buffer occupancy is threshold low. Alternatively or additionally, this could involve predicting, based on historical data, whether the base station's buffer occupancy is now or is about to be threshold low—such as by determining that the base station tends to have threshold low buffer occupancy at the current time of day. The base station could perform such measurements and determinations periodically, for instance, every minute, every hour, or possibly another time interval As noted above, if during a given period the base station determines that the buffer occupancy is at least predefined threshold low, the base station could decrease the maximum limit, thereby decreasing the potential amount of UEs that the base station could concurrently provide with MU-MIMO service.

The maximum limit here could be initially set to a default value. The default value could be a matter of engineering design choice or automated analysis. For example, the default value could be set to a physical limit (e.g., based the number of MIMO layers supported by the base station's MIMO antenna array) on the quantity of UEs that the base station could concurrently provide with MU-MIMO service. Alternatively or additionally, the default value could be set to a percentage (e.g., 25%, 50%, or 75%) of the physical limit. Other default values are possible as well.

In example implementations, the base station could include or could have access to data that defines various predefined buffer occupancy ranges. The maximum value in each predefined buffer occupancy range could correspond to an upper threshold value and the minimum value for each predefined buffer occupancy range could correspond to a lower threshold value. The predefined buffer occupancy ranges could be contiguous so as to cover all possible buffer occupancy values of the base station. Further, each predefined buffer occupancy range could have an associated maximum limit. The base station could thus refer to the various predefined buffer occupancy ranges to determine how to appropriately adjust the maximum limit on the quantity of UEs that the base station will concurrently provide with MU-MIMO service.

For example, the base station could determine the buffer occupancy of the base station and then could identify which predefined buffer occupancy range the determined buffer occupancy falls into. The base station could then set the maximum limit to the corresponding maximum limit associated with that identified buffer occupancy range. If the buffer occupancy of the base station increases above the upper threshold value for that identified range (e.g., becomes at least threshold high) or decreases below the lower threshold value for that identified range (e.g., becomes at least threshold low), the base station could identify a new buffer occupancy range that the buffer occupancy falls into and then could set the maximum limit to the corresponding maximum limit associated with that new range.

Like the default value, the predefined ranges/predefined thresholds here could be a matter of engineering design choice or automated analysis, possibly based on historical buffer occupancies of the base station, historical levels of MU-MIMO service provided by the base station, and/or other analysis.

In line with the discussion above, after the base station sets the maximum limit, the base station could control its application of MU-MIMO service to be in accordance with the set maximum limit. In some implementations, this can include the base station limiting the quantity of UEs that it is concurrently providing with MU-MIMO service to be no more than the set maximum limit.

For example, if the base station is concurrently providing MU-MIMO service to a greater quantity of UEs than the maximum limit, then the base station could responsively decrease the quantity of UEs that it is concurrently providing with MU-MIMO service to be at or below the maximum limit. The base station could do this, for example, by first selecting a subset of UEs from the set of UEs that it currently provides with MU-MIMO service. The base station could then discontinue MU-MIMO service to those selected UEs. In practice, the base station could select the subset of UEs in a manner that helps achieve one or more specific technological goals. For instance, the base station could select the subset of UEs based on a determination that discontinuing MU-MIMO service to those selected UEs would not substantially reduce the base station's overall spectral efficiency. As an example, the base station could select the UEs that have the highest block error rate (BLER), have the highest power headroom, that are moving the most (e.g., at the fastest speed), or that have the least stable radio frequency (RF) conditions, among other possibilities.

Likewise, if the base station is concurrently providing MU-MIMO service to a fewer quantity of UEs than the maximum limit, then the base station could responsively increase the quantity of UEs that it's concurrently providing with MU-MIMO service to be at or near (e.g., within 5% of, within 10% of, etc.) the maximum limit. The base station could do this, for example, by first selecting a subset of UEs from a set of UEs that it currently serves but does not provide with MU-MIMO service. Then, the base station could start providing MU-MIMO service to those selected UEs. As similarly described above, the base station could select the subset of UEs based on a determination that providing MU-MIMO service to those selected UEs would contribute substantially to the base station's overall spectral efficiency. For example, the base station could select UEs that have the lowest BLER, UEs have the lowest power headroom, UEs that are moving the least (e.g., at the lowest speed), and/or UEs that have the most stable RF conditions, among other possibilities.

In line with the discussion above, the base station could be configured to carry out the above functionality continuously, when the base station faces threshold high processing or memory load demands, or in other scenarios. Further, buffer occupancy could be one of possibly multiple factors considered by the base station when setting the maximum limit. The base station might also take into account other, additional factors, such as reported signal strength, transmission power, noise level, resource usage, and/or the like.

Figure 3:
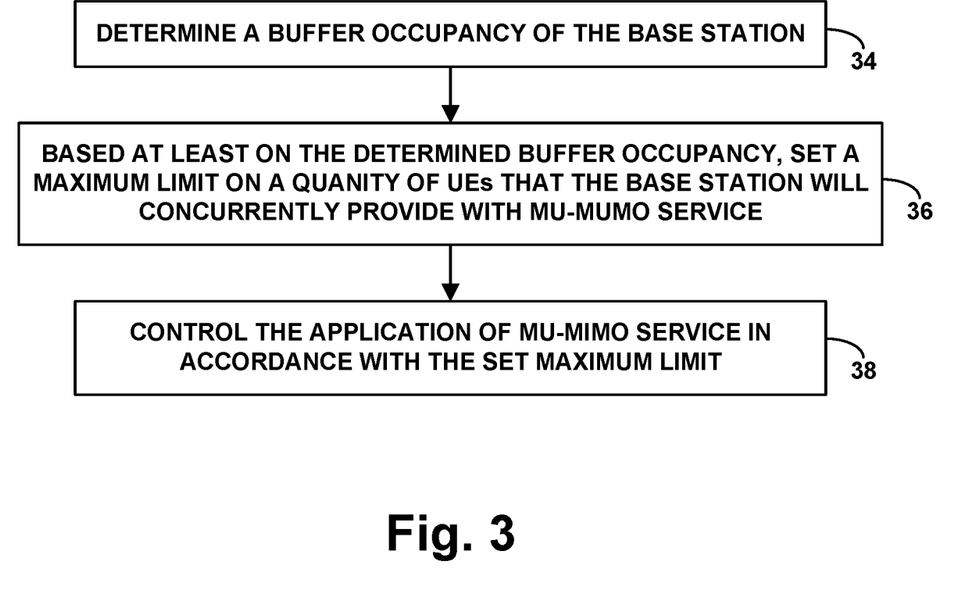
FIG. 3 is a flow chart depicting an example method in accordance with the disclosure.

FIG. 3 is a flow chart depicting an example method that can be carried out to control application of MU-MIMO service by a base station. As described above, aspects of the method could be implemented by a base station (e.g., the base station 12), by an EMS, and/or by one or more other entities.

As shown in FIG. 3, at block 34, the method includes determining a buffer occupancy of the base station. At block 36, the method includes, based at least on the determined buffer occupancy, setting a maximum limit on a quantity of UEs that the base station will concurrently provide with MU-MIMO service. And at block 38, the method includes controlling the application of MU-MIMO service in accordance with the set maximum limit.

In line with the discussion above, the buffer occupancy in this method could comprise a downlink buffer occupancy. The downlink buffer occupancy could be based on user-plane data buffered by the base station pending transmission to one or more UEs connected with the base station.

Further, as discussed above, the maximum limit could initially be set to a default value, and setting the maximum limit could involve adjusting the maximum limit from the default value to another value.

In a representative implementation, as discussed above, adjusting the maximum limit from the default value to the other value could involve: (i) making a determination of whether the determined buffer occupancy of the base station is at least predefined threshold high and (ii) responsive to at least the determination being that the determined buffer occupancy of the base station is at least predefined threshold high, increasing the maximum limit from the default value to the other value.

Further, as discussed above, adjusting the maximum limit from the default value to another value could involve: (i) making a determination of whether the determined buffer occupancy of the base station is at least predefined threshold low and (ii) responsive to at least the determination being that the determined buffer occupancy of the base station is at least predefined threshold low, decreasing the maximum limit from the default value to the other value.

Still further, as discussed above, controlling application of MU-MIMO service in accordance with the set maximum limit could involve limiting a quantity of UEs that the base station is concurrently providing with MU-MIMO service to be no more than the set maximum limit.

In addition, as discussed above, limiting the quantity of UEs that the base station is concurrently providing with MU-MIMO service to be no more than the set maximum limit could involve: (i) making a determination that the base station is concurrently providing MU-MIMO service to a greater quantity of UEs than the set maximum limit and (ii) based at least on the determination, reducing the quantity of UEs that the base station is concurrently providing with MU-MIMO service.

Further, as discussed above, limiting the quantity of UEs that the base station is concurrently providing with MU-MIMO service to be no more than the set maximum limit could involve: (i) making a determination that the base station is concurrently providing MU-MIMO service to a fewer quantity of UEs than the set maximum limit and (ii) based at least on the determination, increasing the quantity of UEs that the base station is concurrently providing with MU-MIMO service to be at the set maximum limit.

Figure 4:
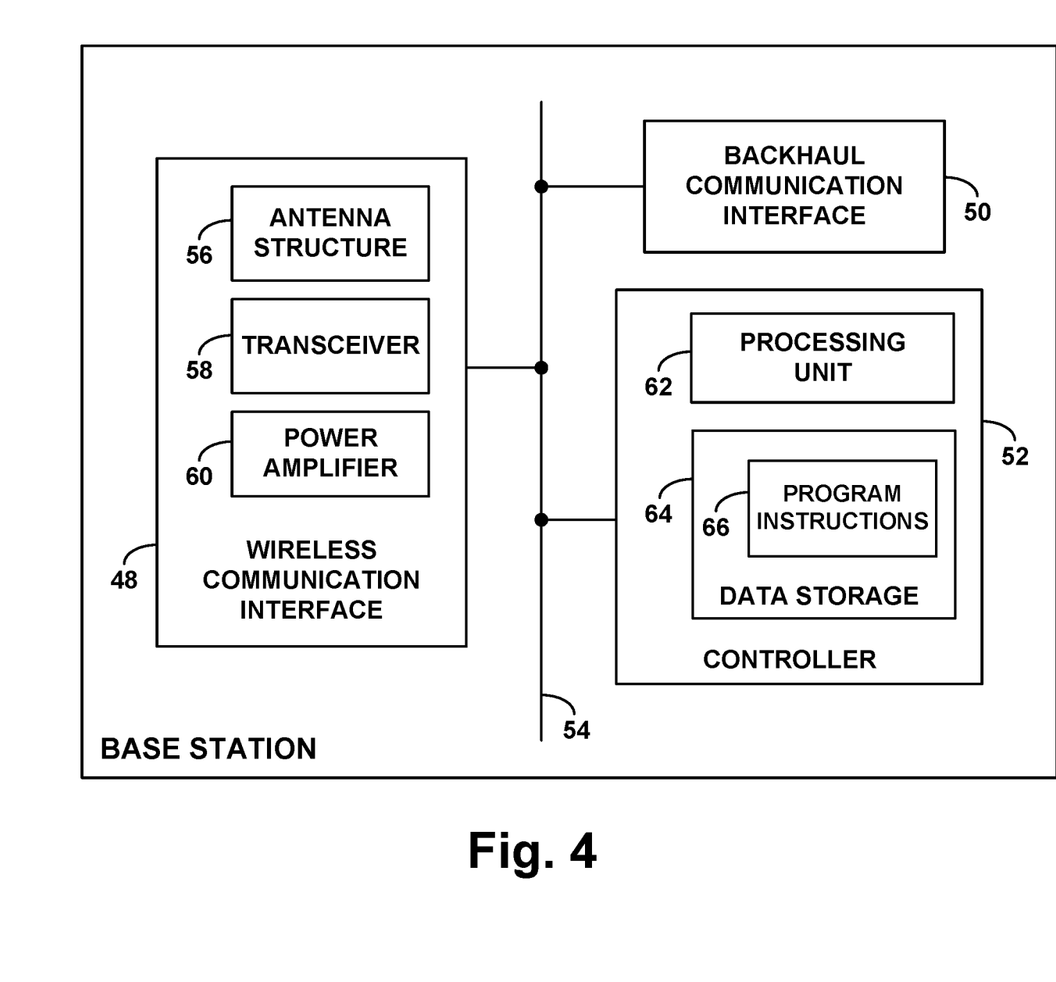
FIG. 4 is a simplified block diagram of an example base station operable in accordance with the disclosure.

FIG. 4 is a simplified block diagram of an example base station, such as base station 12, showing some of the components that could be included in the base station in a non-limiting example implementation. As shown, the example base station includes a wireless communication interface 48, a backhaul communication interface 50, and a controller 52, which could be integrated or communicatively linked together by a system bus, network, or other connection mechanism 54 and/or could be integrated together or distributed in various ways.

The wireless communication interface 48 could include an antenna structure (e.g., a MIMO antenna array, possibly a massive-MIMO array) 56, a transceiver 58, and a power amplifier 60, among one or more other RF components, to cooperatively facilitate air interface communication with UEs served by the base station. Thus, through the wireless communication interface including the antenna structure, the base station could be configured to provide coverage and service on a representative radio access technology as described above.

The backhaul communication interface 50 could comprise a wired or wireless network communication module, such as an Ethernet interface, through which to communicate with other entities, perhaps with the second base station and/or with one or more other entities on or via a core network.

And the controller 52 could be configured to carry out various the operations described herein. For instance, the controller could comprise a processing unit 62 including one or more processors (e.g., general purpose microprocessors and/or dedicated processing units), non-transitory data storage 64 (e.g., one or more volatile and/or non-volatile storage components, such as magnetic, optical or flash storage), and program instructions 66 stored in the non-transitory data storage and executable by the processing unit 62 to cause the base station to carry out the various operations described herein.

For example, in line with the discussion above, the controller 52 could cause the base station to determine the buffer occupancy of the base station. Further, the controller 52 could cause the base station to, based at least on the determined buffer occupancy, set a maximum limit on a quantity of UEs that the base station will concurrently provide with MU-MIMO service. And the controller 52 could cause the base station to control the application of MU-MIMO service in accordance with the set maximum limit.

Various other features discussed above can be implemented in this context, and vice versa.

Figure 5:
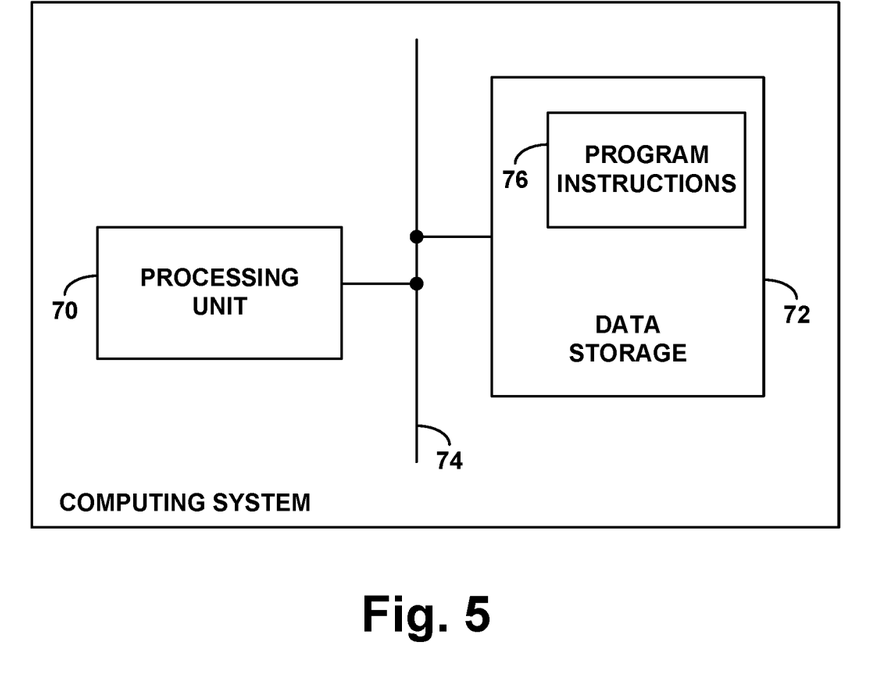
FIG. 5 is a simplified block diagram of an example computing system operable in accordance with the disclosure.

Finally, FIG. 5 is a simplified block diagram of a computing system that could carry out various features as discussed above. This computing system could be incorporated in a base station (e.g., base station 12), an EMS, or one or more other entities for instance. As shown in FIG. 5, the computing system includes a processing unit 70 and non-transitory data storage 72, which could be integrated or communicatively linked together by a system bus, network, or other connection mechanism 74.

The processing unit 70 could comprise one or more processors, such as one or more microprocessors or specialized processors. And the data storage 72 could comprise on or more volatile and/or non-volatile storage components, such as magnetic, optical, or flash storage media. As further shown, the data storage could hold, store, encode, or otherwise embody program instructions 76. In a representative implementation, those program instructions 76 could be executable by the processing unit 70 to carry out various operations that control application of MU-MIMO service by a base station.

For instance, these operations could include (i) determining a buffer occupancy of the base station, (ii) based at least on the determined buffer occupancy, setting a maximum limit on a quantity of UEs that the base station will concurrently provide with MU-MIMO service, and (iii) controlling the application of MU-MIMO service in accordance with the set maximum limit Various other features discussed above can be implemented in this context, and vice versa.

Exemplary embodiments have been described above. Those skilled in the art will understand, however, that changes and modifications may be made to these embodiments without departing from the true scope and spirit of the invention.

I claim:

1. A method for controlling application of Multi-User Multiple-Input-Multiple-Output (MU-MIMO) service by a base station, the method comprising:
   determining a buffer occupancy of the base station;
   based at least on the determined buffer occupancy, setting a maximum limit on a quantity of user equipment devices (UEs) that the base station will concurrently provide with MU-MIMO service, wherein the maximum limit is initially set to a default value, and wherein setting the maximum limit comprises adjusting the maximum limit from the default value to another value; and
   controlling the application of MU-MIMO service in accordance with the set maximum limit.

2. The method of claim 1, wherein the buffer occupancy comprises a downlink buffer occupancy.

3. The method of claim 1, wherein adjusting the maximum limit from the default value to the other value comprises:
   making a determination of whether the determined buffer occupancy of the base station is at least predefined threshold high; and
   responsive to at least the determination being that the determined buffer occupancy of the base station is at least predefined threshold high, increasing the maximum limit from the default value to the other value.

4. The method of claim 1, wherein adjusting the maximum limit from the default value to another value comprises:
   making a determination of whether the determined buffer occupancy of the base station is at least predefined threshold low;
   responsive to at least the determination being that the determined buffer occupancy of the base station is at least predefined threshold low, decreasing the maximum limit from the default value to the other value.

5. The method of claim 1, wherein controlling application of MU-MIMO service in accordance with the set maximum limit comprises limiting a quantity of Ues that the base station is concurrently providing with MU-MIMO service to be no more than the set maximum limit.

6. The method of claim 5, wherein limiting the quantity of UEs that the base station is concurrently providing with MU-MIMO service to be no more than the set maximum limit comprises:
   making a determination that the base station is concurrently providing MU-MIMO service to a greater quantity of UEs than the set maximum limit; and
   based at least on the determination, reducing the quantity of UEs that the base station is concurrently providing with MU-MIMO service.

7. The method of claim 5, wherein limiting the quantity of UEs that the base station is concurrently providing with MU-MIMO service to be no more than the set maximum limit comprises:
   making a determination that the base station is concurrently providing MU-MIMO service to a fewer quantity of UEs than the set maximum limit; and
   based at least on the determination, increasing the quantity of UEs that the base station is concurrently providing with MU-MIMO service to be at the set maximum limit.

8. The method of claim 1, wherein the method is performed by the base station.

9. The method of claim 1, wherein the method is performed by an element management system (EMS) communicatively coupled to the base station.

10. A base station comprising:
    a wireless communication interface through which the base station is configured to engage in air-interface communications; and
    a controller, wherein the controller is configured to perform operations that control application of MU-MIMO service by the base station, the operations comprising:
    determining a buffer occupancy of the base station,
    based at least on the determined buffer occupancy, setting a maximum limit on a quantity of UEs that the base station will concurrently provide with MU-MIMO service, wherein the maximum limit is initially set to a default value, and wherein setting the maximum limit comprises adjusting the maximum limit from the default value to another value, and
    controlling the application of MU-MIMO service in accordance with the set maximum limit.

11. The base station of claim 10, wherein the buffer occupancy comprises a downlink buffer occupancy.

12. The base station of claim 10, wherein adjusting the maximum limit from the default value to the other value comprises:
    making a determination of whether the determined buffer occupancy of the base station is at least predefined threshold high; and
    responsive to at least the determination being that the determined buffer occupancy of the base station is at least predefined threshold high, increasing the maximum limit from the default value to the other value.

13. The base station of claim 10, wherein adjusting the maximum limit from the default value to another value comprises:
    making a determination of whether the determined buffer occupancy of the base station is at least predefined threshold low;

responsive to at least the determination being that the determined buffer occupancy of the base station is at least predefined threshold low, decreasing the maximum limit from the default value to the other value.

14. The base station of claim 10, wherein controlling application of MU-MIMO service in accordance with the set maximum limit comprises limiting a quantity of UEs that the base station is concurrently providing with MU-MIMO service to be no more than the set maximum limit.

15. The base station of claim 14, wherein limiting the quantity of UEs that the base station is concurrently providing with MU-MIMO service to be no more than the set maximum limit comprises:

making a determination that the base station is concurrently providing MU-MIMO service to a greater quantity of UEs than the set maximum limit; and based at least on the determination, reducing the quantity of UEs that the base station is concurrently providing with MU-MIMO service.

16. The base station of claim 14, wherein limiting the quantity of UEs that the base station is concurrently providing with MU-MIMO service to be no more than the set maximum limit comprises:

making a determination that the base station is concurrently providing MU-MIMO service to a fewer quantity of UEs than the set maximum limit; and based at least on the determination, increasing the quantity of UEs that the base station is concurrently providing with MU-MIMO service to be at the set maximum limit.

17. A computing system comprising:

a processing unit;

non-transitory data storage; and program instructions stored in the data storage and executable by the processing unit to carry out operations that control application of MU-MIMO service by a base station, the operations including:

determining a buffer occupancy of the base station;

based at least on the determined buffer occupancy, setting a maximum limit on a quantity of UEs that the base station will concurrently provide with MU-MIMO service, wherein the maximum limit is initially set to a default value, and wherein setting the maximum limit comprises adjusting the maximum limit from the default value to another value; and controlling the application of MU-MIMO service in accordance with the set maximum limit.

\* \* \* \* \*